United States Patent
Matsuura et al.

(10) Patent No.: US 6,315,843 B1
(45) Date of Patent: Nov. 13, 2001

(54) METHOD OF MANUFACTURING A SLIDING COMPONENT

(75) Inventors: Takashi Matsuura; Akira Yamakawa, both of Itami (JP)

(73) Assignee: Sumitomo Electric Industries, Ltd. (JP)

(*) Notice: Subject to any disclaimer, the term of this patent is extended or adjusted under 35 U.S.C. 154(b) by 0 days.

(21) Appl. No.: 09/454,640

(22) Filed: Dec. 6, 1999

Related U.S. Application Data

(60) Continuation-in-part of application No. 09/409,770, filed on Sep. 30, 1999, now abandoned, which is a division of application No. 08/628,656, filed on Mar. 27, 1996, now abandoned.

(30) Foreign Application Priority Data

Dec. 28, 1994 (JP) .................................................. 6-328006

(51) Int. Cl.⁷ ....................................................... C21D 1/18
(52) U.S. Cl. ......................... 148/524; 148/525; 148/528; 148/529; 228/903
(58) Field of Search ................................. 148/524, 525, 148/528, 529; 228/903

(56) References Cited

U.S. PATENT DOCUMENTS 5,076,863 * 12/1991 Taniguti et al. ...................... 148/528
5,084,113 *  1/1992 Mori et al. ............................ 148/525

OTHER PUBLICATIONS

*ASM Handbook*, vol. 4, Heat Treating, "Normalizing of Steel", pp. 35–41 1991.*

* cited by examiner

*Primary Examiner*—George Wyszomierski
(74) *Attorney, Agent, or Firm*—Bierman, Muserlian and Lucas

(57) ABSTRACT

A method of manufacturing a sliding component comprising a main body made of a non-carburized heat-hardened steel and a member adapted to form at least one sliding face of sliding faces of the sliding component and heat-joined to the main body, in which the steel-made main body is heat-hardened before heat-joining to the member and the heat-joining between the main body made of the heat-hardened steel and the member is conducted at a lower temperature than the temperature at which the heat-hardened main body has been heat-hardened. The sliding component is superior in hardness and abrasion resistance and is readily manufactured at a reduced cost.

7 Claims, 3 Drawing Sheets

METHOD OF MANUFACTURING A SLIDING COMPONENT

PRIOR APPLICATIONS

This application is a Continuation-in-Part of U.S. patent application Ser. No. 09/409,770 filed Sep. 30, 1999, abandoned, which is a division of U.S. patent application Ser. No. 08/628,656 filed Mar. 27, 1996, abandoned.

TECHNICAL FIELD

The present invention relates to a sliding member such as a valve train part, a cam follower, or a rocker arm of an automobile engine and, more particularly, to a sliding component which has a structure of a base metal and, joined thereto, a ceramic sliding member and which exhibits an effect when used in a tappet, and to a method of manufacturing the same.

BACKGROUND ART

Sliding components have been selected from the viewpoint of good abrasion resistance on the sliding face and low sliding resistance. A single material having excellent properties has been employed or a composite has been prepared therefrom for practical utilization as a sliding component.

Attention has been drawn to ceramics having excellent sliding properties in recent years. Especially, examples of actual use are found in which a ceramic is joined to a metal material in a manner such that the ceramic is positioned in sliding parts where sliding conditions are severe.

For example, there is an application where a silicon nitride ceramic having good sliding properties is joined to a cam sliding portion of an engine tappet as practiced for a high-powered engine or in compliance with exhaust gas regulations.

The above sliding component is occasionally required to exhibit sliding properties at sliding zones other than the ceramic zone or on the whole body of the component, so that hardening treatment is performed for improving the sliding properties of the metal material.

Thus, the metal part is hardened by the use of the heating and cooling effected when the ceramic is joined to the metal by heating in the previous Japanese,Patent Application Laid-Open Nos. 2-55807, 2-55809, 2-199073 and 4-2672.

However, the above hardening relying on the heat joining has encountered the problems that the heating temperature applied to the sliding part of the body is different from that employed in the conventional heat hardening treatment of steel, thereby occasionally disenabling attainment of a hardness required for the sliding performance, and that the cooling method is special, the variety of metallic material suitable therefor is limited and the cost is increased. For example, the above Japanese Patent Application Laid-Open No. 2-55809 describes the use of a specific steel which is capable of being hardened by martensitic transformation induced by air-cooling after the heat joining. Further, in the Japanese Patent Application Laid-Open No. 2-55807, a main body of a tappet is constituted of a top half part of a carburized steel and a bottom half part of another steel and these parts are hardened by the heating and cooling effected when a ceramic member is brazed to the bottom half part. Therefore, a complicated carburization step is required for the top half part before heat-joining the ceramic member to the main body.

With respect to the above mentioned conventional problem, the present invention is directed to provide a method of manufacturing a sliding component of higher practicability.

DISCLOSURE OF THE INVENTION

In order to achieve the above mentioned object, the present invention provides a method of manufacturing a sliding component comprising a main body made of a non-carburized heat-hardened steel and a member adapted to form at least one sliding face of sliding faces of the sliding component and heat-joined to the main body, in which the steel-made main body is heat-hardened before heat-joining to the member and the heat-joining between the main body made of the heat-hardened steel and the member is conducted at a lower temperature than the temperature at which the heat-hardened main body has been heat-hardened.

Constituent members of the sliding component of the present invention are the steel-made main body thereof which has been heat-hardened before the heat-joining, and one or more slide faces. At least one of the slide faces is joined to the main body by means of heat-joining.

The main body of the sliding component before joining has a surface hardened by means of the heat-hardening. In addition, the temperature of the steel portion during the joining is lower than the heat-hardening temperature for that steel, so that the hardness of the steel joined is almost the same hardness as the one during the heat-hardening. Accordingly, the sliding properties of the sliding component of the present invention is significantly improved as compared with conventional material, which have been hardened during the above mentioned heat-joining, without requiring carburization treatment before the heat-joining or the use of any special steel capable of being transformed into a martensitic structure by air-cooling after the heat-joining, as referred to in the above-mentioned prior art.

A hardness of the steel main body after the joining is 45 or higher in Rockwell hardness ($H_RC$) scale. With $H_RC$ of lower than 45, abrasion becomes large and no durability is given, so that sufficient sliding properties cannot be obtained. The hardness of the steel body before the joining is preferably 50 or higher in $H_RC$ scale because a slight reduction in hardness is caused as the heat-joining.

The material of the main body of the sliding component is steel, and the type thereof is not specifically limited as long as it exhibits 50 or higher in $H_RC$ by the heat-hardening. However, carbon steels or alloy steels including additive alloying elements such as Ni, Cr, or Mo, which are widely used as machine structural steels are preferable from the viewpoints of strength, and costs for the material and working.

A junction area between the member adapted to form the sliding face and the steel main body is preferably 50% or larger of an interface area therebetween. An area smaller than this increases a load applied to the junction portion as compared with the breaking load at that junction portion, increasing the possibility of the member at the sliding face to be stripped off.

The member heat-joined to the main body of the sliding component to form the sliding face is preferably made of a silicon nitride ceramic, and a strength and a Charpy impact value thereof at a room temperature are 130 kg/mm$^2$ or higher and 15 kJ/m$^2$ or larger, respectively.

In this event, the ceramic having the strength of 130 kg/mm$^2$ or higher makes it possible to withstand a thermal tensile stress caused inside the ceramic due to the difference in coefficient of thermal expansion between the steel and the ceramic during the heat-joining and to thereby avoid any cracks without any difficulty.

In addition, considering actual state of usage, a shock loading may act from, for example, a metal cam in a valve train system for an engine as illustrated in FIG. 2. In order to avoid damages of the ceramic thereupon, it is preferable that the Charpy impact value is 15 kJ/m² or larger.

Furthermore, it is preferable that the temperature of the steel during the joining is as lower as possible than the heat-hardening temperature for that steel in order to inhibit temper softening of the steel due to the heat applied during the joining. For example, for a hypo-eutectoid steel, an appropriate heating temperature during the heat-hardening is around 800° C., which is from 30° C. to 50° C. higher than an AC3 or AC1 transformation temperature at which the steel has only an austenite phase during the heating. Accordingly, the temperature of the steel portion during the joining is preferably as lower as possible than 800° C. Any joining methods may be used if the joining temperature satisfies the above mentioned condition, and a known method may be used such as brazing and diffusion joining.

When the member to be heat-joined is ceramic, joining by means of brazing is conducted. For a brazing filler material, it is preferable to use a brazing filler material of which joining temperature is lower than the heat-hardening temperature. For example, when an Al alloy brazing filler material is used, the joining temperature is 580° C., allowing the joining at the significantly lower temperature than the heat-hardening temperature.

In addition, when a brazing filler material such as Ag—Ti or Ag—Cu—Ti whose joining temperature is higher than the heat-hardening temperature for the steel, it is preferable that the temperature of the steel portion is decreased to the lower temperature than that of the brazing filler material portion, and the joining is conducted with the temperature of the steel portion kept lower than the heat-hardening temperature.

Specifically, it is preferable to use a method of heating only the brazing filler material portion by means of, for example, high frequency heating, microwave heating, or laser heating, or a method of heating at a gradient temperature with the ceramic portion being at a high temperature and the steel portion being at a low temperature by means of, for example, electric heating or plasma heating. In addition, a brazing atmosphere is preferably a non-oxidation atmosphere (vacuum, Ar, $N_2$, $H_2$, etc.).

BEST MODE FOR CARRYING OUT THE INVENTION

The present invention is described specifically in conjunction with examples.

EXAMPLE 1

Figure 1:
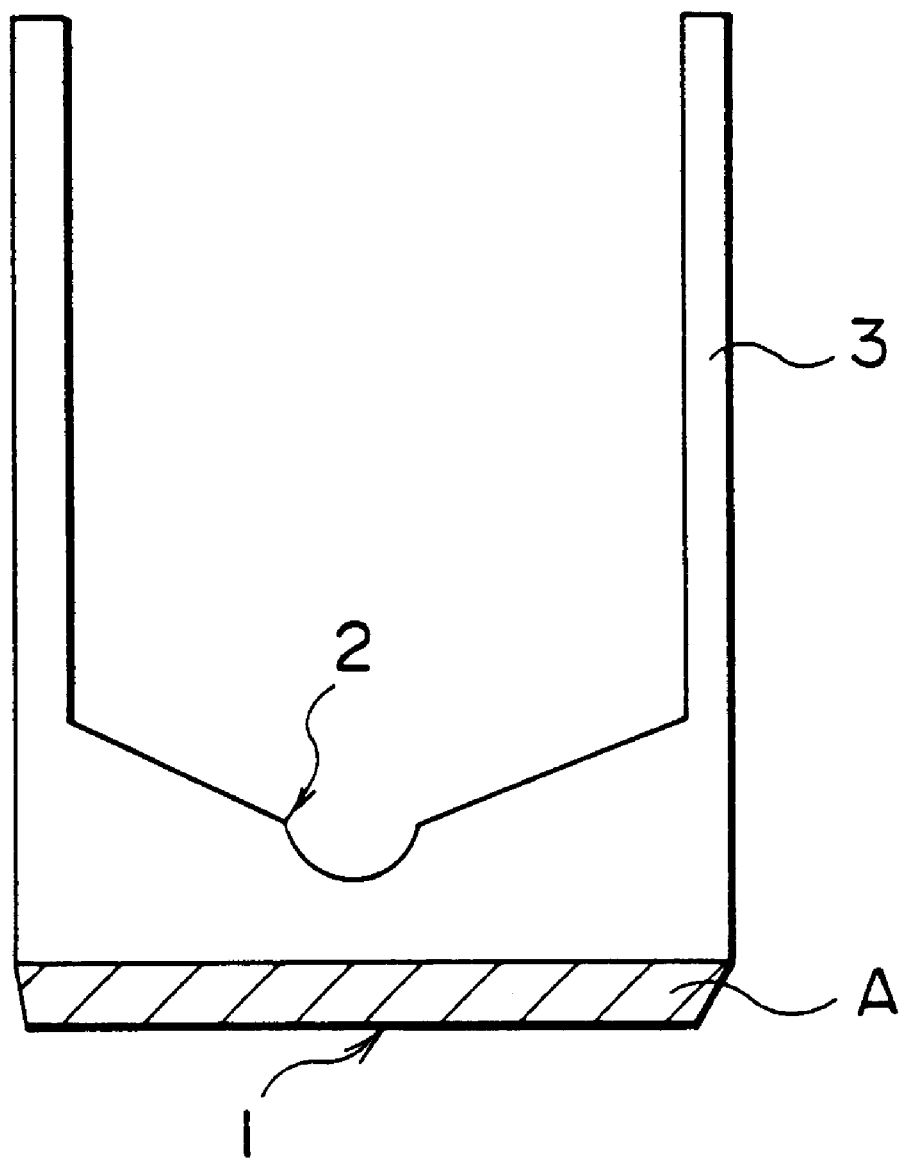
FIG. 1 is a view for use in describing a tappet to which the present invention is applied.
Figure 2:
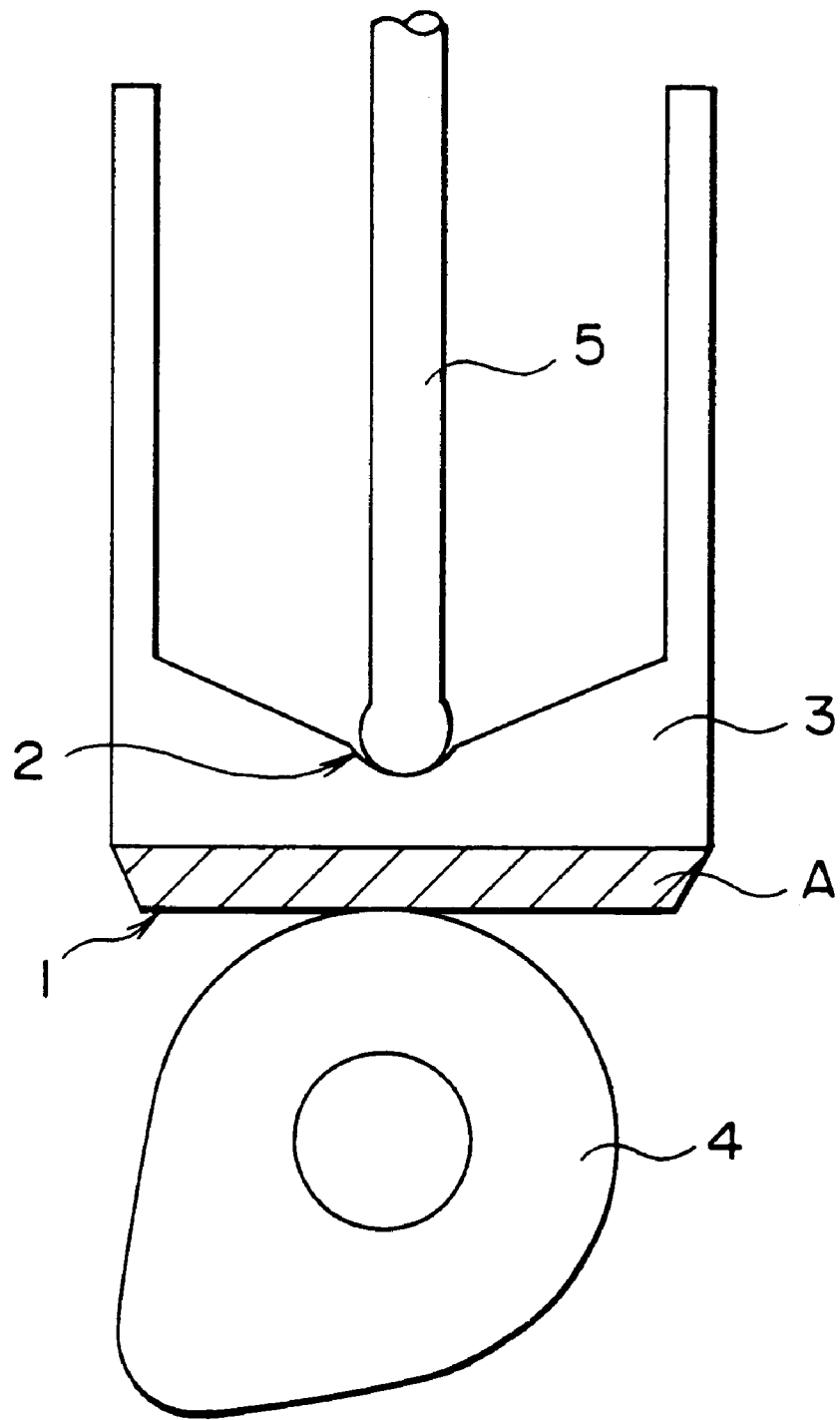
FIG. 2 is a view for use in describing a using state for a tappet.

FIG. 1 shows a tappet manufactured as an example of a sliding component according to the present invention. This tappet has, as apparent from the actual state of usage illustrated in FIG. 2, significantly severe slide conditions for a sliding face 1 and a push rod contact face 2. A silicon nitride sliding member A is joined thereto by means of brazing according to the present invention to form the sliding face 1, and the steel of the push rod contact surface 2 keeps almost the same hardness as the one obtained during the heat hardening. It is noted that, in FIG. 2, 4 indicates a cam, 5 indicates a push rod part. The silicon nitride sliding member A was manufactured in the manner described below.

To a commercially available silicon nitride powder 5% by weight of $Y_2O_3$ and 2% by weight of $Al_2O_3$ were added as sintering aids, which was mixed in ethanol by a ball mill for 48 hours. After dried, the resultant mixed powder was pressed and subjected to CIP, and then subjected to HIP treatment for 1 hour at 1650° C. in a nitrogen gas atmosphere of 2 atm.

A material of 30 mm in diameter and 1 mm in thickness was cut out of the resultant sintered body, and a flat surface to be served as a sliding face was worked to have a flatness of 10 μm and a surface roughness of 0.3 μm or lower (ten point average roughness). Mechanical properties of the resultant sintered body are shown in Table 1 below.

TABLE 1

|  | Mechanical Properties |
| --- | --- |
| Flexural strength | 135 (kg/m²) |
| Charpy Impact Value | 15.2 (kJ/mm²) |

The tappet main body 3 used was an alloy steel for machines, chromium steel SCr440 (JIS G4104). After working, it was heated to 850° C. and subjected to the heat-hardening in oil. Thereafter, the sliding member A and the tappet main body 3 were brazed through an aluminum alloy brazing filler material (JIS-BA4145) of 100 μm in thickness, by using a common resistance heating furnace with a method of keeping it in vacuum at 570° C. for 30 minutes.

As a comparative example, SCr440 without being subjected to the heat-hardening was used as the body 3, and joined to the sliding member A in the same manner as in the above.

The joined tappets so manufactured were measured in hardness of the sliding face 2, and were incorporated into a commercially available diesel engine of OHV type, which were subjected to a durability test for 2000 hours at an engine rotation speed of 1000 rpm by using a deteriorated oil. An abrasion loss of the sliding face 2 was measured.

Table 2 shows the results on the hardness of the sliding face 2 before and after the joining and the abrasion loss. Provided that the determination on the abrasion loss is: "None" for a case where the abrasion loss is less than 10 μm, and "Observed" for 10 μm or more.

As indicated in Table 2, No. 1 which is an Example with the heat-hardening shows only a slight deterioration in hardness before and after the joining, and are superior in hardness and abrasion resistance to No. 4 which is a Comparative Example without the heat-hardening.

As in No. 1, heat-hardened steel materials and brazing filler materials indicated in Nos. 2 and 3 were selected, brazing was conducted in vacuum at the respective joining temperatures, and assessment was conducted. In addition, as comparative examples, steel materials Nos. 5 and 6 without heat-hardening were used for the assessment thereof. For each case, Examples are superior in hardness and abrasion resistance.

TABLE 2

| No. | Material of Sliding Member A | Steel Material | Heat-Hardening Temperature | Brazing Filler Material (JIS) | Joining Temperature | Hardness of Sliding Face 2 (Rockwell's C Code) | | Abrasion |
|---|---|---|---|---|---|---|---|---|
| | | | | | | Before Joining | After Joining | |
| 1 | Silicon nitride | SCr 440 | 850° C. | Aluminum alloy (BA4145) | 570° C. | 60 | 55 | None |
| 2 | Silicon nitride | SCM 420 | 800° C. | Silver brazing filler material (BAg-1) | 620° C. | 62 | 53 | None |
| 3 | Silicon nitride | SNCM 616 | 880° C. | Silver brazing filler material (BAg-7) | 800° C. | 50 | 45 | None |
| *4 | Silicon nitride | SCr 440 | None | Aluminum alloy (BA4145) | 570° C. | 25 | 24 | Observed |
| *5 | Silicon nitride | SCM 420 | None | Silver brazing filler material (BAg-1) | 620° C. | 30 | 28 | Observed |
| *6 | Silicon nitride | SNCM 616 | None | Silver brazing filler material (BAg-7) | 800° C. | 35 | 30 | Observed |

(note) *indicates Comparative Examples

EXAMPLE 2

Figure 3:
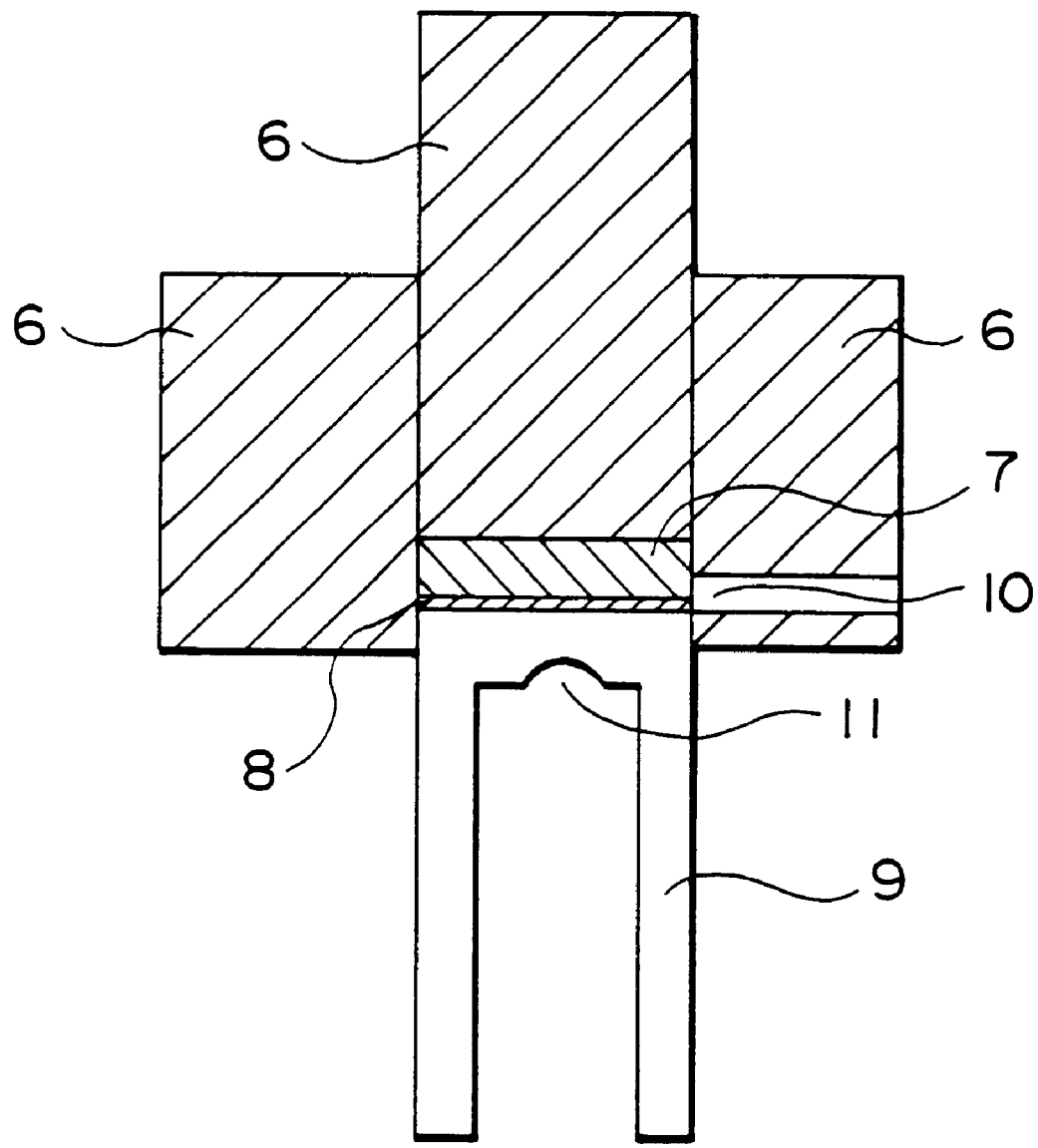
FIG. 3 is a view for use in describing a method of joining a sliding member to a steel-made main body.

FIG. 3 shows a tappet manufactured as another example of a sliding component. Silicon nitride similar to the one in Example 1 was used for a sliding member 7. A machine structural alloy, chromium steel SCr420 (JIS G4104), was used for a steel main body 9 of the tappet. After working, it was heated to 800° C. and subjected to the heat-hardening in oil. Thereafter, the sliding member 7 and the tappet main body 9 were set through an aluminum alloy brazing filler material 8 (JIS-BA4343) of 100 μm in thickness, such that the junction face is located within a carbon-made mold 6, which also serves as a heating unit, and a sliding face 11 portion is exposed outside the heating carbon-made mold 6 as shown in FIG. 3. This carbon-made mold 6 was placed in a furnace capable of rapid heating by means of a mechanical pressurization and a pulse current. A pulse current of 5000 angstrom was applied at an ON-OFF ratio of 12:2 in a state of $10^{-3}$ Torr of vacuum degree. The temperature of the junction face at a thermo-couple 10 was increased to 620° C. for 3 minutes by means of discharge plasma, which was kept for 5 minutes, and then cooled to a room temperature for 5 minutes to conduct brazing. The temperature of the sliding face portion at a thermo-couple 10 for No. 7 was increased to 550° C. at highest.

For No. 10, the same material similar as the one in No. 7 was placed in a common resistance heating furnace, and heated to 620° C. to conduct the brazing. In this case, the junction portion and the sliding face 11 were both heated to 620° C.

The hardness of the sliding face 11 of the joined tappet manufactured in the manner mentioned above was assessed before and after joining. As a result, in the case of No. 7, Example, $H_RC$ was decreased only from 60 to 55 before and after the joining, while in the case of No. 10, Comparative Example, it was decreased from 60 to 48. In addition, No.7 exhibited more favorable sliding properties.

As in No. 7, heat-hardened steel materials and brazing filler materials shown in No. 8 and No.9 were selected, and heated only at the junction face by means of electric heating, high frequency or laser to conduct the brazing. The temperature of the sliding face at that time was lower by approximately 100° C. than the temperature of the junction face. In addition, as Comparative Examples, brazing by means of common resistance heating was conducted for No. 11 and No. 12. As shown in Table 3, for each case, Examples are higher in hardness and exhibit better sliding properties for a sliding component.

TABLE 3

| No. | Steel Material | Heat Hardening Temperature | Brazing Filler Material (JIS) | Heating | Temperature | | Hardness of Sliding Face 2 (Rockwell's C Code) | |
|---|---|---|---|---|---|---|---|---|
| | | | | | Junction Portion | Sliding Face | Before Joining | After Joining |
| 7 | SCr 420 | 800° C. | Aluminum alloy (BA4343) | Plasma heating | 620° C. | 550° C. | 60 | 55 |
| 8 | SCr 420 | 800° C. | Aluminum alloy (BA4343) | Electric heating | 620° C. | 540° C. | 60 | 58 |
| 9 | SCM 440 | 850° C. | Gold brazing filler material (BAu-2) | High frequency heating | 890° C. | 800° C. | 65 | 53 |
| *10 | SCr 420 | 800° C. | Aluminum alloy (BA4343) | Resistance heating | 620° C. | 620° C. | 60 | 48 |

TABLE 3-continued

| No. | Steel Material | Heat Hardening Temperature | Brazing Filler Material (JIS) | Heating | Temperature Junction Portion | Sliding Face | Hardness of Sliding Face 2 (Rockwell's C Code) Before Joining | After Joining |
|---|---|---|---|---|---|---|---|---|
| *11 | SCM 440 | 850° C. | Gold brazing filler material (BAu-2) | Resistance heating | 890° C. | 890° C. | 60 | 43 |
| *12 | SNCM 616 | 880° C. | Nickel brazing filler material (BNi-7) | Resistance heating | 930° C. | 930° C. | 70 | 40 |

(note) *indicates Comparative Examples

EXAMPLE 3

Ten silicon nitride sliding member A having the properties shown in Table 4 below were manufactured for each of Examples and Comparative Examples, and each was joined to SCr 440 by brazing in the same manner as in Example 1.

When the silicon nitride of Example was used, good joined bodies were obtained for all of ten samples. When the silicon nitride of Comparative Example was used, cracking occurred in five silicon nitride portions of ten joined bodies since they couldn't withstand the thermal tensile stress caused inside the ceramic due to the difference in coefficient of thermal expansion between the steel and the ceramic during the heat joining. The joined tappets manufactured (ten tappets in Example and five in Comparative Example) in which no cracking occurred in the silicon nitride were examined for their interface at the junction portion by means of transmission X ray. As a result, the joined area of the joined bodies of Example was from 75 to 100% of the junction interface area. On the other hand, it was from 30 to 48% in Comparative Example.

Next, these joined tappets (ten tappets in Example and five in Comparative Example) were each incorporated into a commercially available diesel engine of OHV type, which were subjected to a durability test for 2000 hours at an engine rotation speed of 1000 rpm by using a deteriorated oil. As a result, ten joined bodies of Example were all good while among the five samples of Comparative Example, two samples were broken in their silicon nitride portions due to the shock loading from the metal cam, and the silicon nitride portions were peeled from the steel main bodies for the remaining three samples.

TABLE 4

|  | Example | Comparative Example |
|---|---|---|
| Flexural Strength | 135 (kg/mm$^2$) | 105 (kg/mm$^2$) |
| Charpy Impact Value | 15.2 (KJ/m$^2$) | 12.8 (KJ/m$^2$) |

TABLE 5

|  | Joined Area | Number of Joined Bodies Broken Upon Joining | Upon Durability Test |
|---|---|---|---|
| Example | 75–100% | 0/10 | 0/10 |
| Comparative Example | 30–48% | 5/10 | 5/5 (peeling occurred in three samples) |

Industrial Applicability

As mentioned above, this invention has an effect of significantly improving the sliding properties by means of a simple manner in which a steel which has been heat-hardened before joining is used as the steel-made main body in the joined sliding component. Therefore, the present invention provides sliding components such as a valve train part, a cam follower, a rocker arm of an automobile engine and the production process thereof.

What we claim is:

1. A method of manufacturing a sliding component comprising a main body made of a non-carburized heat-hardened steel and a member adapted to form at least one sliding face of sliding faces of the sliding component and heat-joined to the main body, comprising heat-hardening with abrupt cooling the steel-made main body before heat-joining to the member and conducting heat-joining between the main body made of the heat-hardened steel and the member while keeping the steel-made main body during the heat-joining at a lower temperature than the temperature at which the heat-hardened main body has been heat-hardened.

2. The method of manufacturing a sliding component as claimed in claim 1, wherein the temperature of a junction portion during the heat-joining is higher than the temperature of the heat- hardened main body.

3. The method of manufacturing a sliding component as claimed in claim 1, wherein the member and the heat-hardened main body are brazed with aluminum or aluminum alloy.

4. The method of manufacturing a sliding component as claimed in claim 1, wherein discharge plasma heating is used for the heat-joining.

5. The method of manufacturing a sliding component as claimed in claim 1, wherein electric heating is used for the heat-joining.

6. The method of manufacturing a sliding component as claimed in claim 1, wherein high-frequency heating is used for the heat-joining.

7. A method of manufacturing a sliding component as claimed in claim 1, wherein laser heating is used for the heat-joining.

* * * * *